United States Patent [19]
Eidenschink et al.

[11] 4,181,625
[45] Jan. 1, 1980

[54] LIQUID CRYSTALLINE CYCLOHEXYLCYCLOHEXANES

[75] Inventors: Rudolf Eidenschink; Joachim Krause; Ludwig Pohl, all of Darmstadt, Fed. Rep. of Germany

[73] Assignee: Merck Patent Gesellschaft mit beschraenkter Haftung, Darmstadt, Fed. Rep. of Germany

[21] Appl. No.: 868,580

[22] Filed: Jan. 11, 1978

[30] Foreign Application Priority Data

Jan. 22, 1977 [DE] Fed. Rep. of Germany ....... 2702598

[51] Int. Cl.² ..................... C07C 121/46; C09K 3/34; G02F 1/13
[52] U.S. Cl. ..................... 252/299; 260/464; 260/465 D; 350/350; 260/455 R; 260/465 E
[58] Field of Search ......................... 260/464; 252/299; 350/350

[56] References Cited

U.S. PATENT DOCUMENTS

| 3,947,375 | 3/1976 | Gray et al. ..................... 260/465 D |
| 3,952,046 | 4/1976 | Scherrer et al. ................. 260/465 D |
| 4,013,582 | 3/1977 | Gavrilovic et al. ................ 252/299 |
| 4,029,594 | 6/1977 | Gavrilovic et al. ................ 252/299 |
| 4,029,595 | 6/1977 | Ross et al. ..................... 252/299 |

OTHER PUBLICATIONS

C. A., Cologne et al., 58 (1963), 1417e.
Gray, "Molecular Structure and the Properties of Liquid Crystals", 1962, p. 149, Academic Press.
Wedel et al., Chemical Physics Letters, 55, (1978), pp. 96–99.
Pohl et al., Analytical Chemistry, Nov. 1978.
C. A., Tilford et al., 44 (1950), 125c.

Primary Examiner—Joseph P. Brust
Attorney, Agent, or Firm—Millen & White

[57] ABSTRACT

Compounds of the formula (I)

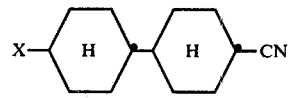

wherein X is —R, —OR or —O—CO—R and R is alkyl of 1–12 C-atoms, are useful as liquid crystals or as solvents for measuring n.m.r., u.v. or visible spectra in anisotropic media.

14 Claims, No Drawings

LIQUID CRYSTALLINE CYCLOHEXYLCYCLOHEXANES

BACKGROUND OF THE INVENTION

The present invention is concerned with liquid crystalline cyclohexane derivatives and with dielectric compositions containing them.

To an increasing extent, the properties of nematic or nematic-cholesteric liquid crystalline materials are being significantly utilized for electro-optical indicating elements. This utility derives from the fact that the optical properties of these materials such as light scattering, birefringence, reflecting power or color change under the influence of electric fields. The function of such indicator elements thereby depends, for example, upon the phenomena of dynamic scattering, the deformation of aligned phases, the Schadt-Helfrich effect in the twisted cell or the cholesteric-nematic phase transition.

For the technical use of these effects in electronic elements, liquid crystalline materials which must satisfy a plurality of requirements are needed. Especially important is a chemical stability to moisture, air and physical influences, such as heat, infra-red, visible and ultraviolet radiation and direct and alternating electric fields. Furthermore, there is required a liquid crystalline mesophase in the temperature range of at least +10° C. to +60° C. and preferably of 0° C. to 60° C., and a low viscosity at ambient temperature, which should preferably be not more than 70 cP, more preferably less than 60 cP. Finally, they should not exhibit an inherent absorption of visible light, i.e., they must be colorless.

A number of liquid crystalline compounds is already known. These satisfy the stability requirements demanded of dielectrics for use in electronic display elements and are also colorless. These include, in particular, the p,p'-disubstituted benzoic acid phenyl esters described in U.S. Pat. No. 4,002,670 (German Patent specification No. 2,139,628) and the p,p'-disubstituted biphenyl derivatives described in U.S. Pat. No. 3,947,375 (German Patent specification No. 2,356,085). In both of these classes of compounds, as well as in other known series of compounds having a liquid crystalline mesophase, there are no individual compounds which form a liquid crystalline nematic mesophase in the required temperature range of 10° C. to 60° C. Therefore, as a rule, mixtures of two or more compounds are produced in order to obtain materials which can be used as liquid crystalline dielectrics. For this purpose, it is customary to mix at least two compounds, one with a low melting and clear point, the other with a distinctly higher melting and clear point. A mixture is thus normally obtained, the melting point of which is below that of the lower melting component, whereas the clear point lies between the clear points of the components. However, optimal dielectrics cannot be produced in this way since the components with the high melting and clear points almost always impart a high viscosity to the mixtures. Consequently, the switch times of the electro-optical indicator elements produced therewith are prolonged in an undesirable manner.

SUMMARY OF THE INVENTION

It is an object of the present invention to provide liquid crystalline dielectrics which exhibit a nematic phase in the required temperature range and permit short switch times in liquid crystal cells.

In a composition aspect, this invention relates to novel trans,trans-cyclohexylcyclohexanes of the formula (I):

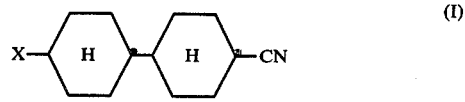

wherein X is —R, —OR or —O—CO—R and R is alkyl of 1–12 C-atoms.

In a second composition aspect, this invention provides liquid crystalline dielectrics containing at least two liquid crystalline components of which at least one is a cyclohexylcyclohexane of the formula (I).

This invention also provides a liquid crystal display element wherein the dielectric comprises a cyclohexylcyclohexane of formula (I).

In a method of use aspect, the present invention provides a method for obtaining n.m.r., u.v. or visible spectra in anisotropic systems which comprises taking such spectra in a solvent consisting of one or more compounds of formula (I).

DETAILED DISCUSSION

It is very surprising that the compounds of formula I are such outstanding base materials for the production of liquid crystalline dielectrics. Hitherto, the presence of a molecular moiety of long extension with a body portion containing at least two conjugatively linked aromatic nuclei was regarded as an important prerequisite for the appearance of a nematic liquid crystalline mesophase. The cyclohexylcyclohexanes of formula (I) do not possess this structural characteristic. Nevertheless, they exhibit liquid crystalline mesophases. Moreover, the temperature ranges thereof, especially with regard to their clear points, in many cases are much more favorable then those of the analogously substituted known liquid crystalline substances, especially the corresponding biphenyl derivatives. In addition, like the known p,p'-disubstituted benzoic acid phenyl esters and the p,p'-disubstituted biphenyl derivatives, the compounds of formula (I) are colorless and possess a comparable chemical and photochemical stability.

The cyclohexylcyclohexanes of formula (I) consist of two trans-substituted cyclohexane rings joined to one another and substituted in the 4- and 4'-positions by an alkyl, alkoxy or alkanoyloxy group and a cyano group, respectively, or vice versa. In each of the alkyl, alkoxy and alkanoyloxy groups, R contains up to 12, preferably 1–10, especially 1–8 carbon atoms. The stereo structure of these compounds may be illustrated as follows:

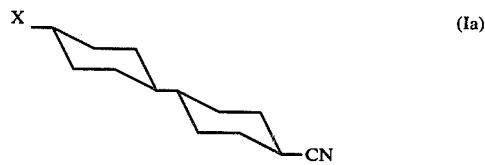

These compounds possess a moderately positive dielectric anisotropy (DCA) having values between +3 to +12. Therefore, they are especially suitable for use as components of dielectrics in indicator elements operating on the basis of the Schadt-Helfrich effect in the twisted nematic cell, or utilizing the phenomenon of the cholestericnematic phase transition, especially when such indicator elements are operated in a multiplex process. Furthermore, the cyclohexylcyclohexanes of formula (I) possess a negative diamagnetic anisotropy (DMA). This means that the diamagnetic susceptibility of the nematic mesophase is smaller in the direction of the molecular longitudinal axis than it is when measured perpendicular to this direction. This property was previously only observed for cholesterol derivatives which form cholesteric-liquid mesophases, but was never observed for any known nematic liquid crystalline substances. It can, for example, be used to prevent the superimposition of liquid crystal indicator elements with electrode rasters or to shorten the switch-off times of such elements.

In the cyclohexylcyclohexanes of this invention, the alkyl, alkoxy and alkanoyloxy groups, X, can be straight-chained or branched. Among these possibilities, the compounds having unbranched side chains, X, i.e., those in which R is methyl, ethyl, n-propyl, n-butyl, n-pentyl, n-hexyl, n-heptyl, n-octyl, n-nonyl, n-decyl, n-undecyl and n-dodecyl, generally possess higher melting and clear points than do the corresponding isomers with branched side chains.

Branched chain R groups in the compounds of formula (I) preferably contain not more than one chain branching. Preferred branched R groups are those in which the carbon chain is branched on the connecting carbon atoms or one of the next two carbon atoms. Preferred among these are those branched radicals R in which, in the 1-, 2- or 3-positions, there is present a methyl or ethyl group, for example, an isopropyl, 1-methylpropyl, 2-methylpropyl, 1-methylbutyl, 2-methylbutyl, 3-methylbutyl, 1-methylpentyl, 1-ethylpentyl, 2-methylpentyl, 1-methylhexyl, 2-ethylhexyl or 1-methylheptyl radical. Among these, those radicals having a main chain length of 4–6 carbon atoms, are preferred. Generally, when R is a branched chain alkyl group, 4–8 total carbon atoms are preferred.

Compounds of formula (I) having a branched side chain X are frequently more soluble in other liquid crystalline materials than are the corresponding straight-chain isomers. When the branched chain contains an asymmetrical carbon atom, the compounds of formula (I) can be prepared in the form of their optical isomers, or can be isolated. These are the first compounds which possess a negative DMA and form cholesteric mesophases without being derived from cholesterol or related cyclopentanoperhydrophenanthrenes.

The cyclohexylcyclohexanes of formula (I) can be prepared in the conventional fashion for such compounds. For example, compound of formula (II)

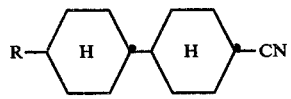
(II)

wherein R is as defined for formula (I), can be prepared by first conventionally hydrogenating the corresponding trans-R-cyclohexylbenzoic acids of formula (III),

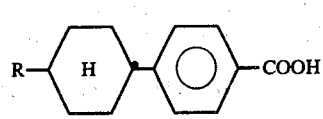
(III)

This is followed by successive reactions of the thus obtained trans-trans-4-R-cyclohexylcyclohexane-4'-carboxylic acid of formula (IV)

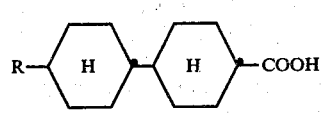
(IV)

with a chlorination agent, such as, for example, thionyl chloride to produce the corresponding trans-trans-4R-cyclohexylcyclohexane-4'-carboxylic acid chloride; with ammonia to produce the corresponding trans-trans-4R-cyclohexylcyclohexane-4'-carboxylic acid amide and finally with an agent for splitting-off water, such as, for example, phosphorus oxide trichloride.

The compounds of formula (I), in which X is —OR or —OCOR, can be prepared by hydrogenating 4-hydroxybiphenyl-4'-carboxylic acid using a conventional hydrogenation catalyst, such as, for example, Raney nickel, platinum oxide or palladium on active charcoal, optionally at elevated temperature and/or elevated pressure, to obtain a mixture of cis-cis-, cis-trans-, trans-cis- and trans-trans-4-hydroxycyclohexyl-cyclohexane-4'-carboxylic acids. The trans-trans-isomer is then separated from this mixture in a conventional manner, for example chromatographically or by formation of an inclusion compound with thiourea.

The cis-cis-, cis-trans- and trans-cis-4-hydroxycyclohexyl-cyclohexane-carboxylic acids separated off after the hydrogenation can also be rearranged wholly or partially into the desired, thermodynamically more stable trans-trans-isomer by equilibration in the presence of a conventional catalyst used for this purpose, for example, potassium tert-butylate in ethanolic solution.

Subsequently, the trans-trans-isomer can be converted into the trans-trans-4-alkanoyl-cyclohexyl-cyclohexane-4'-carboxylic acid by reation with an alkanoyl chloride R-CO-Cl. From this, there is then prepared, as described above, via the stages of the corresponding acid chloride and acid amide, the trans-trans-4-alkanoyloxycyclohexyl-cyclohexane-4'-carbonitrile.

For the preparation of the analogous 4-alkoxy compound, this 4-alkanoyloxy compound can be gently saponified, for example by gentle warming with alcoholic potassium hydroxide solution, to the trans-trans-4-hydroxycyclohexylcyclohexane-4'-carbonitrile and this subsequently converted into the trans-trans-4-alkoxycyclohexyl-cyclohexane-4'-carbonitrile by fully conventional etherification, for example with an alkyl halide in the presence of silver oxide.

Alternatively, compounds of formula (V)

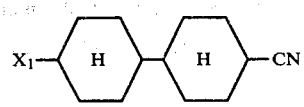
(V)

wherein $X_1$ is -R or -OR and R is defined as in formula (I), can be prepared by hydrogenating a compound of formula (VI)

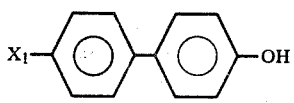

(VI)

under conditions analogous to those described above for 4-hydroxybiphenyl-4'-carboxylic acid; separating the trans-trans-isomer from the resultant mixture of the cis-cis-, cis-trans-, trans-cis- and trans-trans-4-$X_1$-cyclohexylcyclohexane-(4)-ols; converting this isomer by reaction with a chlorination agent, for example thionyl chloride or phosgene, with reversal of configuration, into the trans-cis-4-$X_1$-cyclohexyl-cyclohexyl-4-chloride; and converting this product, by reactions with a cyanide, for example potassium cyanide, with a second reversal of configuration, into the trans-trans-4-$X_1$-cyclohexyl-cyclohexane-(4)-carbonitrile.

All of the chemical reactions described in the foregoing preparations are completely conventional and may be effected under conditions disclosed for example in Houben-Weyl, Methoden der Organischen Chemie (Methods of Organic Chemistry), Fourth Edition, Georg-Thieme-Verlag, Stuttgart, Germany.

The starting materials for the preparation of the compounds of this invention in the above-described manner are either known or can be prepared analogously to the known compounds according to standard methods described in the literature. Thus, for example, the compounds of formula (III) can be prepared in the manner described in co-pending U.S. Pat. Application Ser. No. 823,308, filed 8/10/1977, by reacting 4-R-cyclohexanone with phenyl magnesium bromide and hydrogenating the cis-trans-isomeric 4-R-1-phenylcyclohexanols obtained after hydrolysis, with inversion or retention, after isomer separation, to the trans-4-R-1-phenylcyclohexane; reacting to this in the presence of aluminum chloride with acetyl chloride to form the 4-(trans-4-R-cyclohexyl)-acetophenone and oxidizing this acetophenone with hypohalite to the benzoic acid (III).

The compounds of formula (I) are valuable components for liquid crystalline dielectric compositions which are used for the production of electro-optical indicator elements.

The compounds of formula (I) are also valuable solvents for nuclear magnetic resonance (n.m.r.) spectroscopy in anisotropic systems. They permit the measurement of n.m.r. spectra with a high sensitivity, i.e., with a large signal/noise ratio and with good resolution. The half-widths of the absorption signals in the n.m.r. spectra of samples dissolved in a compound of formula (I) are about 1 to 2 cps and thus are of the same magnitude as the half-widths of signals of spectra taken in isotropic systems.

Additionally, the compounds of formula (I) are also very well suited as solvents for u.v. and visible absorption spectroscopy in anisotropic systems. A particular advantage of the compounds of this invention with regard to this use is that their spectra are free of absorption signals in the wavelength range above 200 nm.

The dielectric compositions of this invention which consist of two or more components, include at least one of formula (I). Other components which can be present are preferably nematic or nematogenic substances of the following classes: azobenzenes, azoxybenzenes, biphenyls, Schiff bases, especially benzylidene derivatives, phenyl benzoates, phenylcyclohexanes, possibly halogenated stilbenes, diphenylacetylene derivatives, diphenyl nitrones and substituted cinnamic acids. The most important compounds for use as such additional components can be characterized by formula (VII)

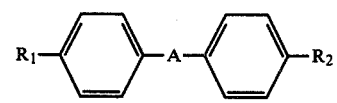

(VII)

wherein A is

| |
|---|
| —CH=CH— |
| 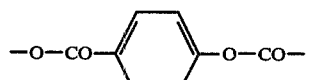 |
| —CZ=CH— |
|  |
| —CH=CZ— |
| 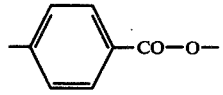 |
| —C≡C— |
| 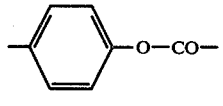 |
| —N=N— |
| 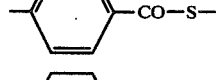 |
| —N(O)N=N— |
| 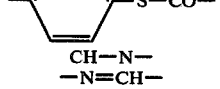 |
| —N=N(O)—    CH—N— |
| —O—CO—      —N=CH— |
| —CO—O—      —CH=N(O)— |
| —S—CO—      —N(O)=CH— |
| —CO—S—      or a C—C single bond; | and when A is —CO—O—, —O—CO— or a C-C single bond, one of the two phenyl rings can also be replaced by a trans-cyclohexyl ring; Z is halogen, preferably Cl; and $R_1$ and $R_2$ are the same or different and are alkyl, alkoxy, alkanoyl, alkanoyloxy or alkoxycarbonyloxy of up to 18, preferably up to 8 C-atoms. Furthermore, one of $R_1$ and $R_2$ can also be a cyano-, nitro or isonitrile group. In the case of most of these compounds, $R_1$ and $R_2$ are preferably different, whereby one is usually an alkyl or alkoxy group. However, a large number of other variants of these substitutents is also conventional. Many such nematic substances are commercially available.

Furthermore, the dielectrics of this invention can optionally additionally contain cholesteric-liquid crystalline compounds, for example cholesterol esters.

Generally, the dielectrics of this invention contain at least 40, preferably 50-99, especially 60-98 parts by weight of the compounds of the formulae (I) and optionally (VII). Of this, preferably at least 15 parts by weight, preferably 20 or more parts by weight, especially 40-90 parts by weight, are one or more compounds of formula (I). However, dielectrics of this invention can also be prepared with consist exclusively of two or more compounds of formula (I).

By means of suitable additives, the liquid crystalline dielectrics of this invention can be so modified that they can be employed in all previously known types of indicator elements which use liquid crystals having positive dielectric anisotropy. Such additives are known to the skilled artisan and are described in detail in the appropriate literature. For example, substances can be added to change the dielectric anisotropy and/or the orientation of the nematic phases. Such substances are described, for example, in Laid-Open German Patent Applications P 22 09 127, P 23 21 632 and P 26 11 453.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the Examples, m.p. signifies the melting point, and c.p. the clear point of a liquid crystalline substance in degrees Celsius. Boiling temperatures are indicated as b.p. Unless stated otherwise, statements of parts or percentages refer to parts by weight or percentages by weight.

EXAMPLE 1

(a) 36.4 g of 4-(trans-4-n-pentylcyclohexyl)-benzoic acid (prepared according to Example 1 of co-pending U.S. patent application Ser. No. 823,308, filed Aug. 10, 1977, by reaction of phenyl magnesium bromide with 4-n-pentylcyclohexanone and subsequent hydrolysis, hydrogenation, acetylation and oxidation) are hydrogenated in 500 ml of glacial acetic acid in the presence of 5 g of platinum oxide at room temperature and under a pressure of 3 bars. The hydrogen uptake is ended after 8 hours. After filtering off the solvent and evaporation, the residue is heated to boiling with 120 g of thionyl chloride for 16 hours. Subsequently, the excess thionyl chloride is distilled off and the residue poured into 500 ml of water. The aqueous mixture is stirred for 1 hour at 50° and then extracted twice with 200 ml amounts of diethyl ether. The extracts are dried over sodium sulphate and evaporated. The trans-trans-4-n-pentylcyclohexyl-cyclohexane-4'-carboxylic acid remaining behind is recrystallized from petroleum benzine (b.p. 50°-70°); m.p. 220°, c.p. 245°.

(b) 15 g of trans-trans-4-n-pentylcyclohexyl-cyclohexane-4'-carboxylic acid are heated to the boil for 20 minutes with 36 g of thionyl chloride; subsequently, the excess thionyl chloride is distilled off, finally under reduced pressure. The trans-trans-4-n-pentylcyclohexyl-cyclohexane-4'-carboxylic acid chloride obtained is dissolved in 450 ml of dioxane and mixed, while cooling with ice, with 180 ml of 25% aqueous ammonia solution. After stirring for one hour, the reaction mixture is poured onto 2000 g of ice. The precipitated trans-trans-4-n-pentylcyclohexylcyclohexane-4'-carboxylic acid amide is filtered off and recrystallized from ethanol; m.p. 215°-218°.

(c) To a solution of 10 g of trans-trans-4-n-pentylcyclohexyl-cyclohexane-4'-carboxylic acid amide in 180 ml of N,N-dimethylformamide there are added dropwise at 40°, 50 g of phosphorus oxide trichloride. The reaction mixture is further stirred for 30 minutes at 50° and, after cooling to room temperature, poured onto 300 g of ice. The aqueous reaction mixture is extracted three times with 100 ml amounts of diethyl ether, and the extract is dried over sodium sulphate and evaporated. The trans-trans-4-n-pentylcyclohexyl-cyclohexane-4'-carbonitrile remaining behind is recrystallized from ethanol; m.p. 62°, c.p. 85°.

There are prepared analogously:
trans-trans-4-methylcyclohexyl-cyclohexane-4'-carbonitrile,
trans-trans-4-ethylcyclohexyl-cyclohexane-4'-carbonitrile,
trans-trans-4-n-propylcyclohexyl-cyclohexane-4'-carbonitrile,
trans-trans-4-n-butylcyclohexyl-cyclohexane-4'-carbonitrile,
trans-trans-4-n-hexylcyclohexyl-cyclohexane-4'-carbonitrile,
trans-trans-4-n-heptylcyclohexyl-cyclohexane-4'-carbonitrile,
trans-trans-4-n-octylcyclohexyl-cyclohexane-4'-carbonitrile,
trans-trans-4-n-nonylcyclohexyl-cyclohexane-4'-carbonitrile,
trans-trans-4-n-decylcyclohexyl-cyclohexane-4'-carbonitrile,
trans-trans-4-n-undecylcyclohexyl-cyclohexane-4'-carbonitrile,
trans-trans-4-n-dodecylcyclohexyl-cyclohexane-4'-carbonitrile,
trans-trans-4-n-isopropylcyclohexyl-cyclohexane-4'-carbonitrile,
trans-trans-4-(1-methylpropyl)-cyclohexyl-cyclohexane-4'-carbonitrile,
trans-trans-4(2-methylpropyl)-cyclohexyl-cyclohexane-4'-carbonitrile,
trans-trans-4-(1-methylbutyl)-cyclohexyl-cyclohexane-4'-carbonitrile,
trans-trans-4-(2-methylbutyl)-cyclohexyl-cyclohexane-4'-carbonitrile,
trans-trans-4-(3-methylbutyl)-cyclohexyl-cyclohexane-4'-carbonitrile,
trans-trans-4-(1-methylpentyl)-cyclohexyl-cyclohexane-4'-carbonitrile,
trans-trans-4-(2-methylpentyl)-cyclohexyl-cyclohexane-4'-carbonitrile,
trans-trans-4-(1-methylhexyl)-cyclohexyl-cyclohexane-4'-carbonitrile,
trans-trans-4-(2-ethylpentyl)-cyclohexyl-cyclohexane-4'-carbonitrile,
trans-trans-4-(1-methylheptyl)-cyclohexyl-cyclohexane-4'-carbonitrile,
trans-trans-4-(2-ethylhexyl)-cyclohexyl-cyclohexane-4'-carbonitrile.

EXAMPLE 2

(a) A solution of 100 g of 4-hydroxy-biphenyl-4'-carboxylic acid in 1000 ml of acetic acid is hydrogenated in the presence of 10 g of platinum oxide at room temperature and normal pressure for 16 hours. Subsequently, it is filtered off from the catalyst, evaporated and the residue heated to the boil in 500 ml of tert-butanol in the presence of 150 g of potassium tert-butylate. After cooling to room temperature, the reaction mixture is poured onto 1000 g of ice, neutralized with 10% sulphuric acid and extracted twice with 500 ml of amounts of diethyl ether. The ether extract is dried over sodium sulphate, evaporated and the residue taken up in 500 ml of boiling methanol. The hot solution obtained is poured into a boiling solution of 200 g of thiourea in 800 ml of methanol. After 30 minutes, the mixture is cooled to 0°, and the thiourea inclusion compound crystallizing out is filtered off and boiled out with 1000 ml of petroleum ether (b.p. 40°–60°). The undissolved residue is heated to 50° from 30 minutes with 1000 ml of aqueous 2 N aqueous potassium hydroxide solution. The solution obtained is acidified with 10% sulphuric acid after cooling and the precipitated trans-trans-4-hydroxycyclohexyl-cyclohexane-4'-carboxylic acid is filtered off and recrystallized from petroleum benzine (b.p. 50°–70°).

(b) A solution of 30 g of trans-trans-4-hydroxycyclohexyl-cyclohexane-4'-carboxylic acid in a mixture of 300 ml of toluene and 30 ml of pyridine is mixed at room temperature with 13.6 g of n-butyryl chloride and the reaction mixture stirred for 2 hours at 50°. Subsequently, the reaction mixture is poured onto 500 g of ice; the organic phase is separated off, washed with water, dried over sodium sulphate and evaporated. The trans-trans-4-n-butyryloxycyclohexyl-cyclohexane-4'-carboxylic acid remaining behind is recrystallized from ethanol.

(c) Analogously to Example 1 (b) and 1 (c), from 20 g of trans-trans-4-n-butyryloxycyclohexyl-cyclohexane-4'-carboxylic acid there are prepared 9.8 g of trans-trans-4-n-butyryloxycyclohexyl-cyclohexane-4'-carbonitrile.

There are prepared analogously:
trans-trans-4-acetoxycyclohexyl-cyclohexane-4'-carbonitrile
trans-trans-4-propionyloxycyclohexyl-cyclohexane-4'-carbonitrile,
trans-trans-4-isobutyryloxycyclohexyl-cyclohexane-4'-carbonitrile,
trans-trans-4-n-pentanoyloxycyclohexyl-cyclohexane-4'-carbonitrile,
trans-trans-4-α-methylpropionyloxycyclohexyl-cyclohexane-4'-carbonitrile,
trans-trans-4-n-hexanoyloxycyclohexyl-cyclohexane-4'-carbonitrile,
trans-trans-4-n-heptanoyloxycyclohexyl-cyclohexane-4'-carbonitrile,
trans-trans-4-n-octanoyloxycyclohexyl-cyclohexane-4'-carbonitrile,
trans-trans-4-n-nonanoyloxycyclohexyl-cyclohexane-4'-carbonitrile,
trans-trans-4-n-decanoyloxycyclohexyl-cyclohexane-4'-carbonitrile.

EXAMPLE 3

10 g of trans-trans-4-n-butyryloxycyclohexyl-cyclohexane-4'-carbonitrile are warmed with 250 ml of ethanolic 2 N potassium hydroxide solution for 30 minutes at 40°, while stirring. The reaction mixture is then diluted with 500 ml of water and neutralized with 10% sulphuric acid. The neutral reacting solution is extracted four times with 250 ml amounts of diethyl ether. The extracts are dried over sodium sulphate and evaporated. The trans-trans-4-hydroxycyclohexylcyclohexane-4'-carbonitrile remaining behind is dissolved in 100 ml of n-butyl iodide and the solution heated to the boil for 24 hours after the addition of 10 g of silver (I) oxide. Subsequently, the reaction mixture is filtered and the excess butyl iodide distilled from the filtrate. The residue is taken up in 30 ml of toluene and purified on a silica gel column (20×2 cm). After evaporation of the toluene, the trans-trans-4-n-butyloxycyclohexylcyclohexane-4'-carbonitrile remaining behind is recrystallized from ethanol.

There are obtained analogously:
trans-trans-4-methoxycyclohexyl-cyclohexane-4'-carbonitrile,
trans-trans 4-ethoxycyclohexyl-cyclohexane-4'-carbonitrile,
trans-trans-4-n-propyloxycyclohexyl-cyclohexane-4'-carbonitrile,
trans-trans-4-n-pentyloxycyclohexyl-cyclohexane-4'-carbonitrile,
trans-trans-4-n-hexyloxycyclohexyl-cyclohexane-4'-carbonitrile,
trans-trans-4-n-heptyyloxycyclohexyl-cyclohexane-4'-carbonitrile,
trans-trans-4-n-octyloxycyclohexyl-4'-carbonitrile,
trans-trans-4-n-nonyloxycyclohexyl-cyclohexane-4'-carbonitrile,
trans-trans-4-b-decyloxycyclohexyl-cyclohexane-4'-carbonitrile,
trans-trans-4-n-undecyloxycyclohexyl-cyclohexane-4'-carbonitrile,
trans-trans-4-n-dodecyloxycyclohexyl-cyclohexane-4'-carbonitrile,
trans-trans-4-n-isopropyloxycyclohexyl-cyclohexane-4'-carbonitrile,
trans-trans-4-(1-methylpropyloxy)-cyclohexyl-cyclohexane-4'-carbonitrile,
trans-trans-4(1-methylbutyloxy)-cyclohexyl-cyclohexane-4'-carbonitrile,
trans-trans-4-(2-methylbutyloxy)-cyclohexyl-cyclohexane-4'-carbonitrile,
trans-trans-4-(1-methylpentyloxy)-cyclohexyl-cyclohexane-4'-carbonitrile,
trans-trans-4-(2-methylpentyloxy)-cyclohexyl-cyclohexane-4'-carbonitrile,
trans-trans-4(3-methylpentyloxy)-cyclohexyl-cyclohexane-4'-carbonitrile,
trans-trans-4-(1-methylhexyloxy)-cyclohexyl-cyclohexane-4'-carbonitrile,
trans-trans-4-(2-ethylpentyloxy)-cyclohexyl-cyclohexane-4'-carbonitrile,
trans-trans-4-(1-methylheptyloxy)-cyclohexyl-cyclohexane-4'-carbonitrile,
trans-trans-4-(2-ethylhexyloxy)-cyclohexyl-cyclohexane-4'-carbonitrile.

The following Examples concern liquid crystalline dielectrics of this invention:

EXAMPLE 4

A mixture of 33% trans-trans-4-n-pentylcyclohexyl-cyclohexane-4'carbonitrile and 67% trans-4-n-propyl-1-(4'-cyanophenyl)-cyclohexane possesses a nematic liquid crystalline phase in the temperature range of 25°–57° and a DCA of +8.2.

EXAMPLE 5

A mixture of 40% trans-trans-4-n-pentylcyclohexyl-cyclohexane-4'-carbonitrile and 60% 4-n-octyloxy-4'-cyanobiphenyl possesses a nematic liquid crystalline phase in the temperature range of 34°–75° and a DCA of +9.

EXAMPLE 6

A mixture of 10% trans-trans-4-n-pentylcyclohexyl-cyclohexane-4'-carbonitrile, 60% 4-n-butyl-4'-methoxyazoxybenzene and 30% 4-ethyl-4'-methoxyazoxybenzene possesses a nematic liquid crystalline phase in the temperature range of 5°–74° and a DCA of +1.3,

EXAMPLE 7

A mixture of 55% trans-trans-4-n-pentylcyclohexyl-cyclohexane-4'-carbonitrile and 45% trans-trans-4-n-propylcyclohexyl-cyclohexane-4'-carbonitrile possesses a clear point of 81°, a DCA of about +4 and a negative DMA.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modification of the invention to adapt it to various usages and conditions.

What we claim is:

1. A trans-trans-cyclohexylcyclohexane of the formula

wherein X is —R, —OR or —O—CO—R and R is straight-chain alkyl of 1–12 C-atoms or alkyl of 1–12 carbon atoms containing only one chain branch, that branching being on the connecting carbon atom or one of the next two carbon atoms.

2. The cyclohexylcyclohexane of claim 1, wherein R is a straight-chain alkyl.

3. The cyclohexylcyclohexane of claim 1, wherein R is alkyl of 1–10 C-atoms.

4. The cyclohexylcyclohexane of claim 1, wherein R is alkyl with 1–8 C-atoms.

5. The cyclohexylcyclohexane of claim 1, wherein X is R.

6. Trans-trans-4-methylcyclohexyl-cyclohexane-4'-carbonitrile,
   trans-trans-4-ethylcyclohexyl-cyclohexane-4'-carbonitrile,
   trans-trans-4-n-propylcyclohexyl-cyclohexane-4'-carbonitrile,
   trans-trans-4-n-butylcyclohexyl-cyclohexane-4'-carbonitrile,
   trans-trans-4-n-pentylcyclohexyl-cyclohexane-4'-carbonitrile,
   trans-trans-4-n-hexylcyclohexyl-cyclohexane-4'-carbonitrile,
   trans-trans-4-n-heptylcyclohexyl-cyclohexane-4'-carbonitrile,
   trans-trans-4-n-octylcyclohexyl-cyclohexane-4'-carbonitrile,
   trans-trans-4-n-nonylcyclohexyl-cyclohexane-4'-carbonitrile, and
   trans-trans-4-n-decylcyclohexyl-cyclohexane-4'-carbonitrile, compounds of claim 5.

7. Trans-trans-4-isopropylcyclohexyl-cyclohexane-4'-carbonitrile,
   trans-trans-4-(1-methylpropyl)-cyclohexyl-cyclohexane-4'-carbonitrile,
   trans-trans-4-(2-methylpropyl)-cyclohexyl-cyclohexane-4'-carbonitrile,
   trans-trans-4-(1-methylbutyl)-cyclohexyl-cyclohexane-4'-carbonitrile,
   trans-trans-4-(2-methylbutyl)-cyclohexyl-cyclohexane-4'-carbonitrile,
   trans-trans-4-(3-methylbutyl)-cyclohexyl-cyclohexane-4'-carbonitrile,
   trans-trans-4-(1-methylpentyl)-cyclohexyl-cyclohexane-4'-carbonitrile,
   trans-trans-4-(2-methylpentyl)-cyclohexyl-cyclohexane-4'-carbonitrile,
   trans-trans-4-(1-methylhexyl)-cyclohexyl-cyclohexane-4'-carbonitrile,
   trans-trans-4-(2-ethylpentyl)-cyclohexyl-cyclohexane-4'-carbonitrile,
   trans-trans-4-(1-methylheptyl)-cyclohexyl-cyclohexane-4'-carbonitrile, and
   trans-trans-4-(2-ethylhexyl)-cyclohexyl-cyclohexane-4'-carbonitrile, compounds of claim 5.

8. The cyclohexylcyclohexane of claim 1 wherein X is —OR.

9. Trans-trans-4-methoxycyclohexyl-cyclohexane-4'-carbonitrile,
   trans-trans-4-ethoxycyclohexyl-cyclohexane-4'-carbonitrile,
   trans-trans-4-n-propyloxycyclohexyl-cyclohexane-4'-carbonitrile,
   trans-trans-4-n-butyloxycyclohexyl-cyclohexane-4'-carbonitrile,
   trans-trans-4-pentyloxycyclohexyl-cyclohexane-4'-carbonitrile,
   trans-trans-4-n-hexyloxycyclohexyl-cyclohexane-4'-carbonitrile,
   trans-trans-4-n-heptyloxycyclohexyl-cyclohexane-4'-carbonitrile,
   trans-trans-4-n-octyloxycyclohexyl-cyclohexane-4'-carbonitrile,
   trans-trans-4-n-nonyloxycyclohexyl-cyclohexane-4'-carbonitrile,
   trans-trans-4-n-decyloxycyclohexyl-cyclohexane-4'-carbonitrile,
   trans-trans-4-n-undecyloxycyclohexyl-cyclohexane-4'-carbonitrile, and
   trans-trans-4-n-dodecyloxycyclohexyl-cyclohexane-4'-carbonitrile, compounds of claim 8.

10. Trans-trans-4-isopropyloxy-cyclohexyl-cyclohexane-4'-carbonitrile,
    trans-trans-4-(1-methylpropyloxy)-cyclohexylcyclohexane-4'-carbonitrile,
    trans-trans-4-(1-methylbutyloxy)-cyclohexylcyclohexane-4'-carbonitrile,
    trans-trans-4-(2-methylbutyloxy)-cyclohexylcyclohexane-4'-carbonitrile,
    trans-trans-4-(1-methylpentyloxy)-cyclohexylcyclohexane-4'-carbonitrile,
    trans-trans-4-(2-methylpentyloxy)-cyclohexylcyclohexane-4'-carbonitrile,
    trans-trans-4-(3-methylpentyloxy)-cyclohexylcyclohexane-4'-carbonitrile,
    trans-trans-4-(1-methylhexyloxy)-cyclohexylcyclohexane-4'-carbonitrile,
    trans-trans-4-(2-ethylpentyloxy)-cyclohexylcyclohexane-4'-carbonitrile,
    trans-trans-4-(1-methylheptyloxy)-cyclohexylcyclohexane-4'-carbonitrile, and
    trans-trans-4-(2-ethylhexyloxy)-cyclohexylcyclohexane-4'-carbonitrile, compounds of claim 8.

11. The cyclohexylcyclohexane of claim 1 wherein X is —O—CO—R.

12. Trans-trans-4-acetoxycyclohexyl-cyclohexane-4'-carbonitrile, trans-trans-4-propionyloxycyclohexyl-cyclohexane-4'-carbonitrile,
trans-trans-4-isobutyryloxycyclohexyl-cyclohexane-4'-carbonitrile,
trans-trans-4-n-butyryloxycyclohexyl-cyclohexane-4'-carbonitrile,
trans-trans-4-n-pentanoyloxycyclohexyl-cyclohexane-4'-carbonitrile,
trans-trans-4-α-methylpropionyloxycyclohexylcyclohexane-4'-carbonitrile,
trans-trans-4-n-hexanoyloxycyclohexyl-cyclohexane-4'-carbonitrile,
trans-trans-4-n-heptanoyloxycyclohexyl-cyclohexane-4'-carbonitrile,
trans-trans-4-n-octanoyloxycyclohexyl-cyclohexane-4'-carbonitrile,
trans-trans-4-n-nonanoyloxycyclohexyl-cyclohexane-4'-carbonitrile, and
trans-trans-4-n-decanoyloxycyclohexyl-cyclohexane-4'-carbonitrile, compounds of claim 11.

13. A liquid crystalline dielectric composition comprising at least 2 liquid crystalline components, wherein at least one component is a compound of claim 1.

14. In a liquid crystal display element comprising a liquid crystalline dielectric composition, the improvement wherein the liquid crystalline dielectric composition comprises a compound of claim 1.

* * * * *